United States Patent [19]

Jonasson

[11] Patent Number: 5,106,488
[45] Date of Patent: Apr. 21, 1992

[54] DEVICE FOR SEPARATING PARTICLES FROM FLOWING MEDIUM

[75] Inventor: Alf I. S. Jonasson, Hyllinge, Sweden

[73] Assignee: AB Ph. Nederman & Co., Helsingborg, Sweden

[21] Appl. No.: 482,860

[22] Filed: Feb. 22, 1990

[30] Foreign Application Priority Data

Mar. 3, 1989 [SE] Sweden .................. 8900735

[51] Int. Cl.⁵ .............................................. B07B 9/00
[52] U.S. Cl. ......................................... 209/17; 209/23; 209/144; 209/211; 209/389; 210/298
[58] Field of Search .............. 209/17, 21, 22, 23, 209/144, 211, 385, 389; 210/298, 407; 55/337, 429, DIG. 3

[56] References Cited

U.S. PATENT DOCUMENTS

| | | | |
|---|---|---|---|
| 3,494,474 | 2/1970 | Estabrook | 209/211 X |
| 3,797,064 | 3/1974 | MacFarland | 55/429 X |
| 3,898,414 | 8/1975 | Hawley | 219/72 |
| 3,918,944 | 11/1975 | Treuhaft et al. | 55/337 |
| 4,107,033 | 8/1978 | Holz | 209/273 X |
| 4,202,761 | 5/1980 | Holz | 209/273 X |
| 4,309,284 | 1/1982 | Morimoto et al. | 209/273 |
| 4,581,050 | 4/1986 | Krantz | 55/429 X |
| 4,810,270 | 3/1989 | Terry et al. | 55/294 |
| 4,954,249 | 9/1990 | Gero et al. | 209/273 |

FOREIGN PATENT DOCUMENTS

| | | |
|---|---|---|
| 0169330 | 1/1986 | European Pat. Off. |
| 849950 | 7/1949 | Fed. Rep. of Germany |
| 3214255 | 10/1983 | Fed. Rep. of Germany |
| 343061 | 11/1989 | France |
| WO83/03556 | 10/1983 | PCT Int'l Appl. |
| WO85/04115 | 9/1985 | PCT Int'l Appl. |
| 436972 | 2/1985 | Sweden |
| 451947 | 11/1987 | Sweden |
| 669885 | 4/1952 | United Kingdom |

Primary Examiner—Donald T. Hajec
Assistant Examiner—Joseph A. Kaufman
Attorney, Agent, or Firm—Foley & Lardner

[57] ABSTRACT

The present invention relates to a device for separating particles from flowing medium, whereby separation of coarse particles occurs in a cyclone member (4) and separation of fine particles in a filter device (10) inside the cyclone member. For providing this separation of coarse particles in a cyclone member and additionally, fine separation in a cleanable filter device, there is, inside the cyclone member (4), provided a filter cleaning device (15) which engages filter material (16) included in the filter device (10) for cleaning said filter material from particles adhering thereto when the filter device (10) is rotated relative to the filter cleaning device (15), the filter cleaning device (15) relative to the filter device (10) or the filter device (10) and the filter cleaning device (15) relative to each other.

4 Claims, 3 Drawing Sheets

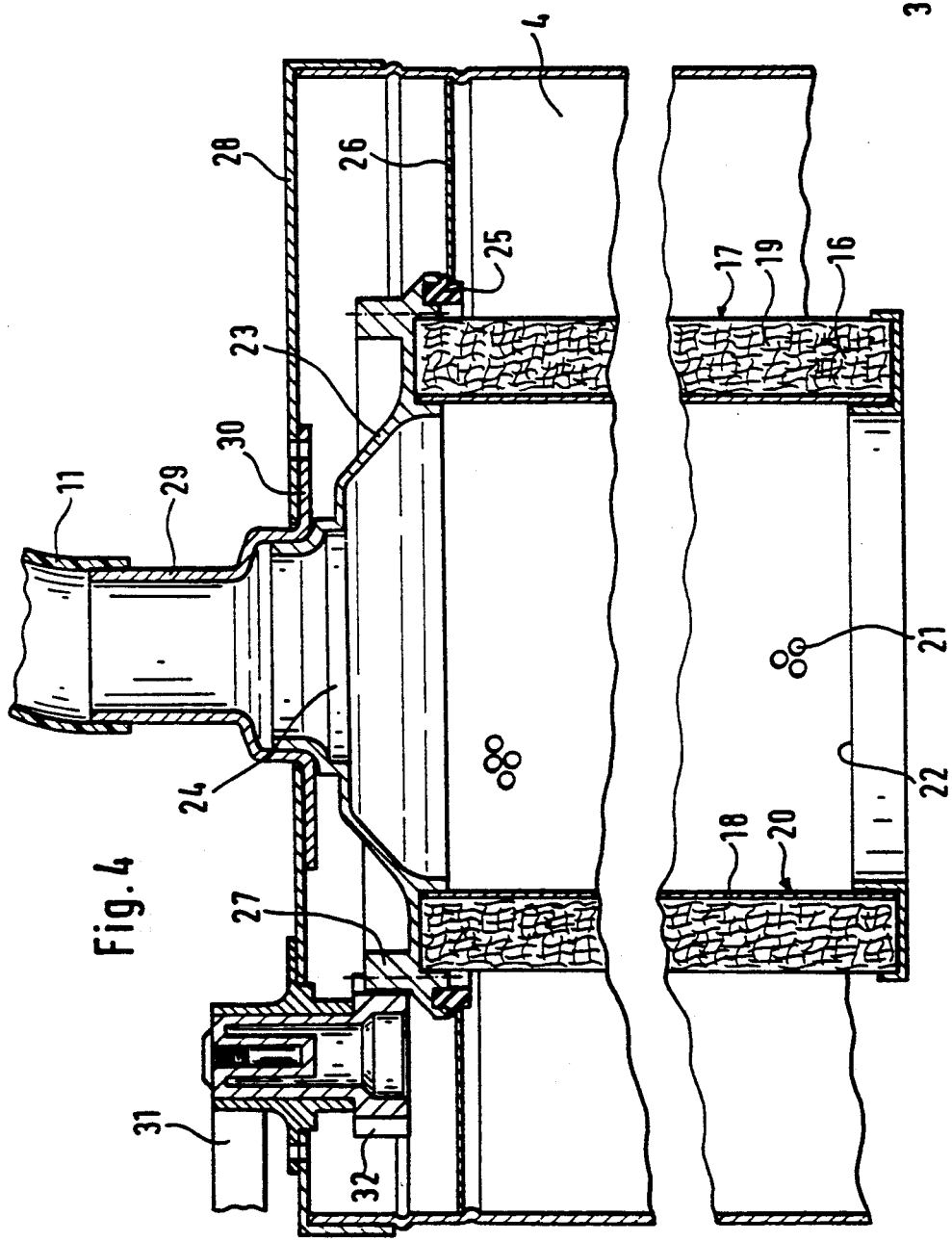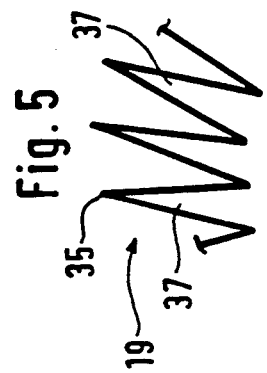

DEVICE FOR SEPARATING PARTICLES FROM FLOWING MEDIUM

FIELD OF THE INVENTION

The present invention relates to a device for separating particles from flowing medium, whereby separation of coarse particles occurs in a cyclone member and separation of fine particles in a filter device inside the cyclone member.

BRIEF DESCRIPTION OF THE RELATED ART

Devices of the above type with a fine filter device disposed inside a cyclone member are previously known from e.g. SE public specification 436 972 and GB patent specification 669 885. In these specifications, filter bodies are shown having self-cleaning properties when they are affected by the flow of medium in the cyclone member. However, such a cleaning method is not suitable for all types of filter bodies, it is e.g. not suitable for cleaning filter cartridges with folded filter casings. Filter devices which through relative movements cooperate with cleaning devices for cleaning without demounting the filter device are already known from e.g. applicant's SE public specification 451 947. In this specification there is shown a rotatable filter body, the folded filter casing of which is set in motion by the filter cleaning device such that particles on the filter casing loosen. Such filter devices however, do not give the advantages of a cyclone member redarding separation of coarse particles.

SUMMARY OF THE INVENTION

The object of the present invention has therefore been to provide a device permitting separation of coarse particles in a cyclone member and additionally, fine separation in a cleanable filter device e.g. of the filter cartridge type with folded filter material casing and positioned inside the cyclone member.

The above object is met by providing a device having a cyclone member with an inner cylindrical wall. The cyclone member has disposed therein a filter device consisting of a cylindrical casing of a folded filter material which engages a filter cleaning element. The filter cleaning element has flange portions which protrude between the folds of the filler material such that upon rotation of the filler material, the filter cleaning element or both, the engagement of the flange with the filter element causes particles which have adhered to the filter element to be thrust toward the cylindrical inner wall.

Due to these features spaces in the cyclone member are utilized for receiving such cleaning devices which by engaging outer portions of the filter device permit efficient cleaning thereof.

BRIEF DESCRIPTION OF THE DRAWINGS

The invention will be further described below with reference to the accompanying drawings, in which:

FIG. 4 is a section through a filter cartridge forming part of the device of the invention and through upper portions of a cyclone member; and FIG. 5 finally, is a section through the filter material of the filter cartridge along the line V—V in FIG. 4.

DETAILED DESCRIPTION OF THE PREFERRED EMBODIMENTS

Figure 1:
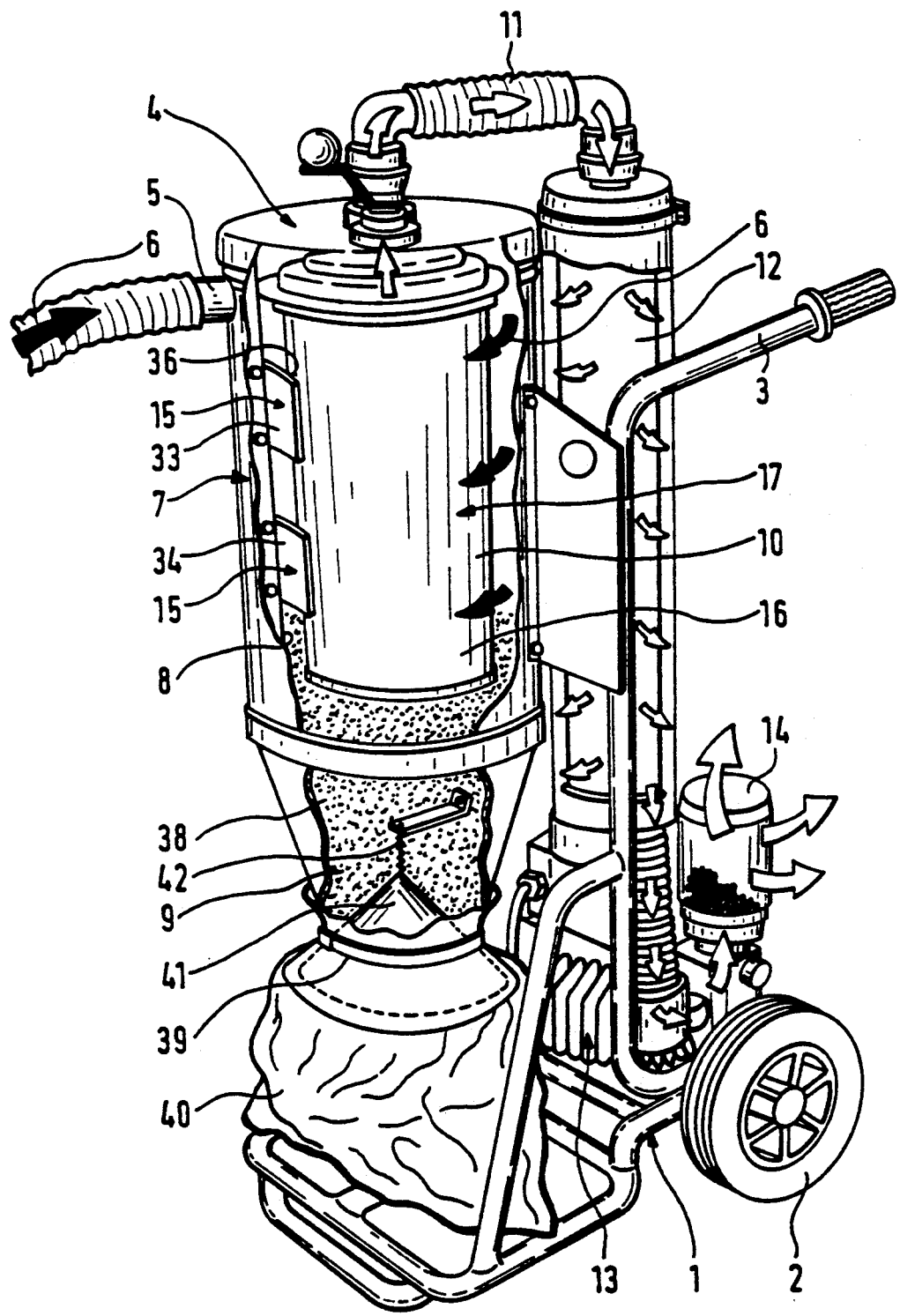
FIG. 1 is a perspective view of a so called precipitator with a device according to the invention.
Figure 2:
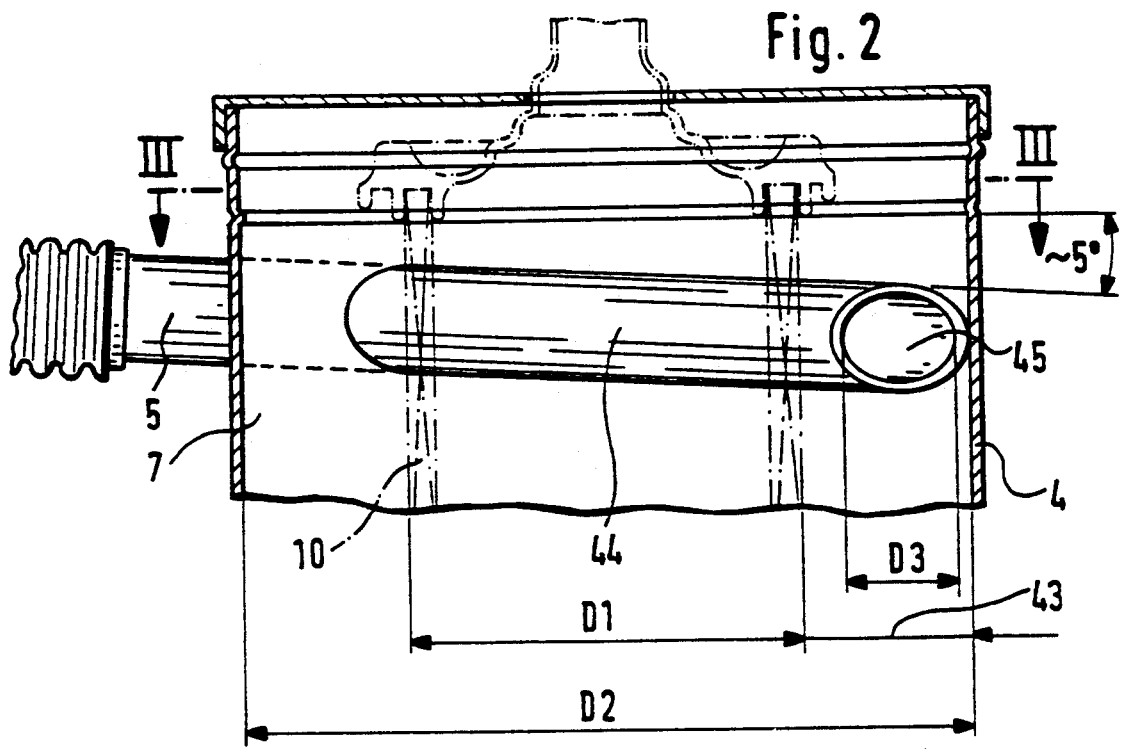
FIG. 2 is a section through an upper portion of a cyclone member of the precipitator.
Figure 3:
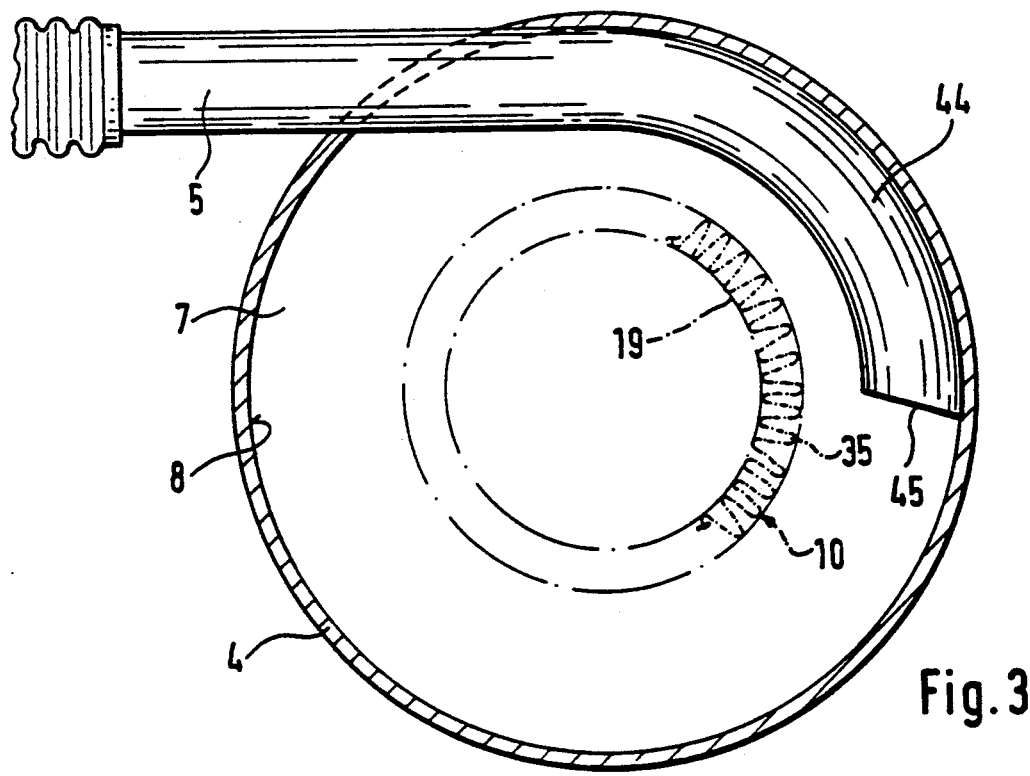
FIG. 3 is a section through the upper portion along the line III—III in FIG. 2.

FIG. 1 illustrates a mobile aggregate mounted on a chassis 1 with drive wheels 2 and driving handle 3. On the chassis 1 there is mounted a cyclone member 4 which on top has a medium inlet 5 for introducing medium 6 mixed up with particles of various sizes and from which medium said particles shall be separated. The medium inlet 5 is provided to feed medium 6 to a cylindrical chamber 7 in the cyclone member 4 is a way known per se, such that said medium flows downwards in helical paths along the cylindrical inner side 8 of the chamber 7. While said medium 6 is brought to flow through the cyclone member 4 at a certain velocity, a cyclone effect is generated, meaning that coarse particles 9 are separated from the flow of medium 6 and fall downwards in the cyclone member 4.

The cyclone member 4 includes a filter device 10 for separating fine particles when medium flows therethrough and out through an outlet conduit 11. This conduit 11 is in the embodiment shown connected to a fine filter device 12 of the FLIPSTRIP ® type for separating fine particles such as invisible or almost invisible dust particles which are injurious to the lungs. The filter device 12 is connected to a pump 13, preferably a so called turbo pump with an output of 3,0 kW, which is sufficient for generating a negative pressure in the various members of the device for obtaining the required cyclone and filter effect. Cleaned medium finally flows out through a sound damper 14.

The filter device 10 disposed in the cyclone member 4 is rotatable relative to a filter cleaning device 15 in order to, when required, clean the filter material 16 of the filter device 10 by loosening the particles present thereon. In the embodiment shown, the filter device 10 includes a filter cartridge 17 in the form of a continuous cylinder 18 of a longitudinally folded casing 19 of the filter material 16 (see FIG. 5). The cylinder 18 is provided on a drum 20 with holes 21 for letting through flowing medium. The filter cartridge 17 is down below closed by a bottom element 22 such that medium will not enter this way. The drum 20 and casing 19 of fiber material engage on top an end wall 23 with a central outlet opening 24. The end wall 23 is rotatably mounted on an annular flange 25 provided on a wall portion 26 of the cyclone member 4. The end wall 23 has a circular gear ring 27 with outwardly directed teeth. A cover 28 is attachable to the upper end portion of the cyclone member 4 and the attachment is carried out preferably by threading the cover onto said end portion, and remains thereon due to a tight fit. The cover 28 has an upwardly directed pipe socket 29 which with an inner, annular flange 30 engages the end wall 23 and holds it in position. The outlet conduit 11 is threaded onto the pipe socket 29 and consists preferably of a hose. On the cover 28 there is also provided a crank 31 with a gear wheel 32 in mesh with the gear ring 27 on the end wall 23. This crank is adapted to rotate the filter cartridge 17 relative to the cyclone member 4 and this is carried out by transferring the rotating movement of the crank 31 through the gear wheel 32 and gear ring 27. The filter cleaning device 15 comprises, in the embodiment shown, two rinse fingers 33 and 34 which are fixedly attached to the cyclone member 4, engage the inner side 8 thereof and protrude therefrom towards the casing 19 of filter material 16 of the filter cartridge 17. Each rinse finger 33, 34 extends with its free end portion substantially tangential relative to the casing 19 and engage the peaks 35 of the folds of filter material, whereby flange portions 36 in each rinse finger 33, 34 protrudes in between two folds 37. The rinse fingers 33, 34 preferably consist of resilient material such that they may spring inwards/outwards relative to the casing 19. Such a simple filter cleaning device 15 permits effecient cleaning or rinsing of the filter cartridge 17. When the cartridge is rotates, the folds 37 of the casing will be drawn backwards relative to the direction of rotation by means of the rinse fingers 33, 34 until they "let go" by a springing action, whereby the fold "drawn backwards" springs "forward". During rotation of the filter cartridge 17 each fold 37 is affected in this way, which means that particles adhering to the outer side of the filter material are thrown outwards from the filter cartridge and thus, an effecient cleaning thereof. Beneath the filter cartridge 17, the cyclone member 4 has a space 38 for collecting the coarse particles released by the cyclone effect in the cyclone member 4 as well as the smaller particles which have adhered to the filter device 10 and which have been removed therefrom by means of the filter cleaning device 15. The coarse and fine particles in the space 38 will adhere to each other, especially if they are moist, which means that they prevent each other from whirling up from said space 38. Down below, the space 38 has a bottom opening 39 for emptying said space and down below on the cyclone member 4 there is suspended a collecting container 40, preferably in the form of a collecting bag of a material previous to air, for collecting particles falling down through the bottom opening 39. The opening 39 is kept closed by a conical valve element 41 when a normal negative pressure is present in the cyclone member 4 during operation of the device.

The valve element 41 is suspended in a spring 42 with such a spring force that the valve element 41 may sink and open the bottom opening 39 when said valve element 41 during operation of the device is loaded with particles, preferably damp particles and/or liquid before the level of particles and/or liquid reaches the filter cartridge 17. Hereby, it is guaranteed that the filter material 16 can not get damaged by being loaded and/or soaked by particles collected in the space 38. When the negative pressure in the cyclone member 4 ceases, i.e. the operation of the device is stopped, the valve element 41 will not be able to maintain its closing position if loaded by particles, but opens the bottom opening 39 such that the particles gathered or collected thereon can fall down into the collecting container 40. In order to not damage the filter material 16 of the filter device 10, the medium inlet 5 is mounted such that is guides the inlet flow of medium to flow around the filter device 10 without larger particles and/or liquid in the flow striking the filter material 16. For obtaining this moment of security, the filter cartridge 17 according to the embodiment shown has been designed with a substantially smaller outer diameter $D_1$ than the inner diameter $D_2$ of the cylindrical inner side 8 of the cyclone member 4. Hereby, a gap 43 is defined between the filter cartridge 17 and said inner side 8 such that coarse particles and/or liquid flowing in through the medium inlet 5 move downwards along said inner side 8 in a helical path around the filter cartridge 17 without striking the filter material 16 of the filter cartridge 17 at any occasion. In order to further increase the safety of this function, the medium inlet 5 preferably includes an extension 44 which extends into the cyclone member 4, follows the arcuate shape of its cylindrical inner side 8 about a quarter of a revolution or somewhat more and is directed somewhat downwards, preferably 3-8°, towards the lower portions of the cyclone member 4. The extension 44 preferably consists of a bent tube, with an end opening 45, having a substantially less diameter $D_3$ than the width of the gap 43 between the filter cartridge 17 and said inner side 8. By means of this extension 44 incoming medium and particles and/or liquid therein are forced to set in an arcuate movement around the filter cartridge 17 before said medium and its particles and/or liquid therein can move freely in the cyclone member. Hereby, it is guaranteed that the particles and/or drops of liquid can not "bounce" into the cyclone member 4, but follow the arcuate shape of the inner side 8 as soon as they become free.

The invention is not limited to the embodiment described above and shown in the drawings, but may vary within the scope of the following claims. As an example of an embodiment neither shown nor described one can mention that the filter device 10 may be of another type than the filter cartridge 17 shown; the filter cleaning device 15 may be of another type than a number of rinse fingers; the filter device 10 may be of the stationary type and the filter cleaning device 15 instead of the rotating type; the filter device 10 as well as the filter cleaning device may be of the rotating type; the filter device 10 and/or filter cleaning device 15 may be rotated by means of a motor instead of being manually rotatable; the extension 44 may be of another type than a tube; the fine filter device 12 can eventually be dispensed with.

I claim:

1. A device for separating particles from flowing medium comprising:

a cyclone member having a cylindrical inner wall;

a filter cartridge having a cylindrical casing of folded filter material disposed in said cyclone member;

a filter cleaning device engaging said folded filter material, whereby said filter cleaning device removes particles which have adhered to said folded filter material when said filter cleaning device engages said folded filter material and said filter cartridge rotates relative to said filter cleaning device;

wherein when said flowing medium is introduced into said cyclone member, coarse particles are separated in said cyclone member, fine particles are separated in said filter cartridge, and any of said fine or coarse particles adhered to said filter material are thrown outward toward said cylindrical inner wall;

said filter cartridge being rotatably mounted at a top inside of said cyclone member, and said filter cleaning device having at least one rinse finger mounted on said cyclone member and engaging said folded filter material casing;

said rinse fingers including flange portions which protrude between said folds of said filter material;

said filter cartridge further having an end wall through which said filter cartridge is rotatably mounted on said cyclone member, and wherein said end wall has an outlet opening through which medium may flow out of said filter cartridge; and said filter cartridge being maintained in position in said cyclone member by means of a cover attachable to said cyclone member and engaging said end wall of said filter cartridge, and said end wall having a rotating device with a gear wheel cooperating with a gear ring on said end wall, whereby said filter cartridge is rotatable relative to said filter cleaning device.

2. Device according to claim 1, wherein the end wall further includes a protruding pipe socket which is connected to an outlet conduit for discharging medium from the filter cartridge.

3. Device according to claim 1, wherein the folded filter material casing has a substantially less outer diameter than the diameter of the cylindrical inner wall of the cyclone member thereby defining a gap around the folded filter material casing of such a width that at least one of particles and liquid flowing through the gap follow said cylindrical inner wall without striking the filter material casing.

4. Device according to claim 3, further comprising a medium inlet connected to the cyclone member which has an extension which extends into the cyclone member follows the arcuate shape of the cylindrical inner wall of the cyclone member, about a quarter of a revolution, and is directed from about 3-8° towards lower portions of the cyclone member, wherein said extension has an end opening with a substantially less diameter than the width of the gap between said cylindrical inner wall and the folded filter material casing.

* * * * *